United States Patent Office 3,003,395
Patented Oct. 10, 1961

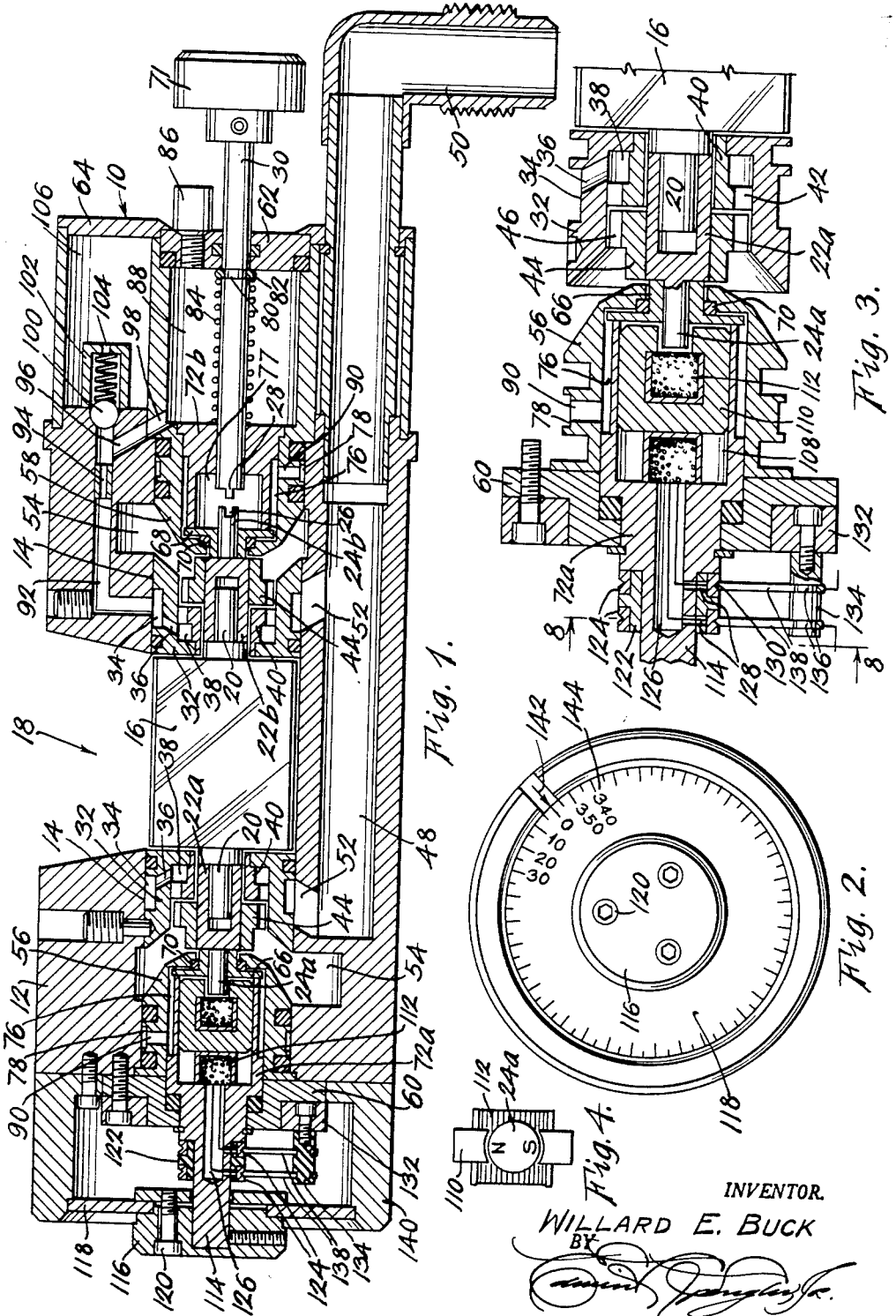

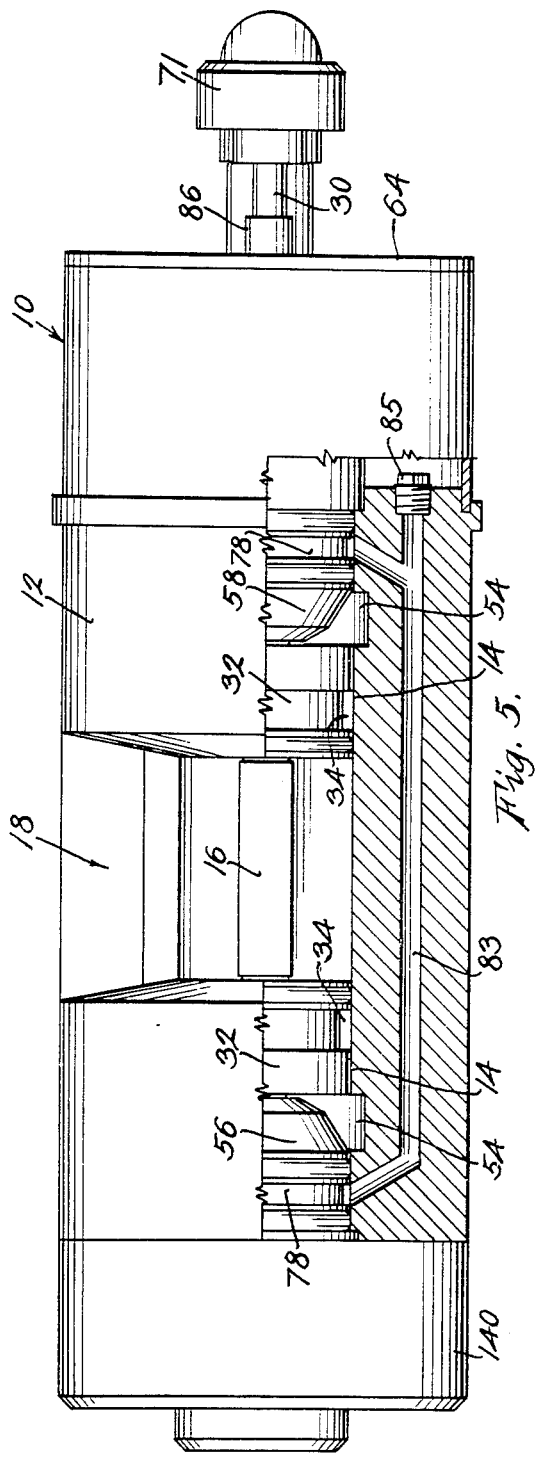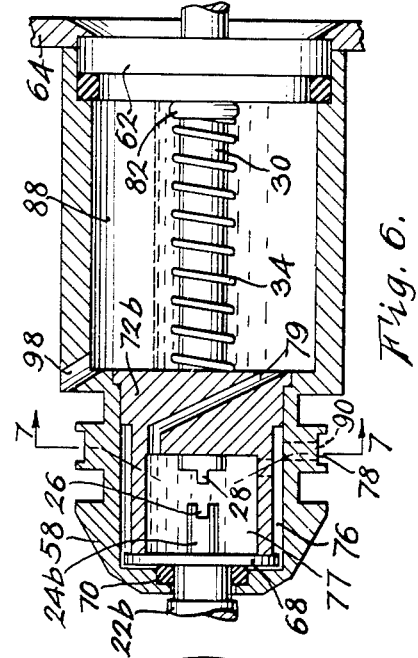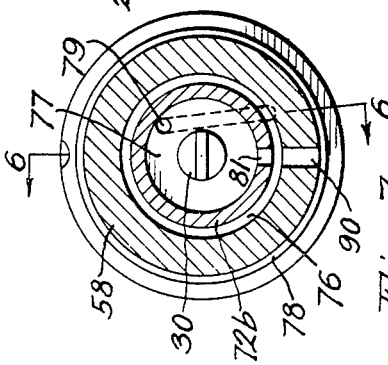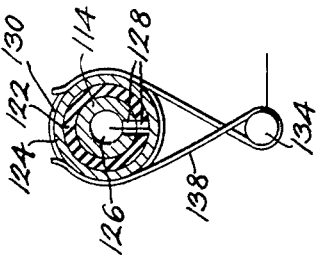
INVENTOR.
WILLARD E. BUCK
ATTORNEY

3,003,395
HIGH-SPEED, GAS TURBINE DRIVEN MIRROR WITH ADJUSTABLE PULSE GENERATING MEANS
Willard E. Buck, Box 357, Boulder, Colo.
Filed May 20, 1957, Ser. No. 660,165
6 Claims. (Cl. 88—74)

This invention relates to high-speed turbines and is a continuation in part of my copending application Serial Number 567,148, now U.S. Patent 2,886,285 issued May 12, 1959.

In my copending application above identified, I disclosed an improved and novel gas-cooled bearing arrangement for use with high-speed turbines of the type which attain rotational speeds as high as 15,000 r.p.s. Basically, this gas-cooling system provided a construction wherein the compressed air, hydrogen, helium or other gas used as a driving medium for the turbine was expanded into an exhaust cavity adjacent an oil-sealed bearing to accomplish rapid and continuous cooling thereof. The gaseous driving medium was also fed through a by-pass connection into an oil reservoir where the pressure of the gas was used to pressurize the oil to the bearings.

It has now been found, however, in accordance with the present invention that the foregoing system is somewhat inadequate when the turbine is used interchangeably with different gaseous driving mediums such as air and helium although it functions quite well when designed for use with one gas exclusively. In many instances, however, it is highly desirable to be able to operate the turbine with two or more different gaseous mediums depending upon the speed required. For example, compressed air is generally used for operation of the turbine at lower speeds due to its low cost and availability; whereas, at high speeds approaching the maximum for a given design, air will not work and helium must be used. It was found that the bearing clearances required for relatively low-speed air operation were not satisfactory for high-speed helium operation because too much oil was forced through the bearings at high speeds and pressures; and, conversely, bearings designed with the proper clearance for use under high-speed and pressure conditions were inadequately cooled and lubricated under low pressures and speeds.

It is, therefore, one of the principal objects of the present invention to provide a gas-driven high-speed turbine having a gas-cooling system and incorporating means for preventing the oil pressure from exceeding a predetermined maximum so that said turbine can be operated interchangeably with two or more gaseous mediums over a wide range of pressures.

High-speed turbines of the type which form the subject matter of the present invention and my copending application above identified, are used primarily to turn polished metal mirrors of sweeping-image and framing cameras that record extremely short-lived events. These mirrors are incorporated as a part of the turbine and must be designed to withstand tremendous forces of operational speeds of the order of 10,000 to 15,000 r.p.s. Heretofore, special alloy steels have been used to make mirrors which would withstand these forces without disintegrating.

In high-speed photography with sweeping-image rotating mirror cameras capable of taking a series of pictures at rates of over 3,000,000 frames per second, it is important to be able to initiate the short-lived event to be photographed at the precise instant the mirror attains a given desired rotarial position relative to the film. For example, the operator may wish the mirror positioned to expose the first frame of film at the instant the event commences so that the full sequence of the event can be recorded. In order to accomplish this, however, the event may have to be triggered in advance of the time the mirror reaches the position to expose the first frame to account for any time delay in the actuating device. On the other hand, it may be desirable to have the picture-taking sequence lead or lag the start of the event being photographed for certain purposes and in special situations. Thus, it becomes necessary to know the exact angular position of the polished face of the mirror relative to the film at any given instant plus being able to control the timing of the event being photographed with relation to this mirror position.

In the past, the rotating mirrors have been made in their entirety of alloy steel including the mirror shafts formed integrally therewith. Synchronization of the mirror with the event being photographed was accomplished by forming the steel mirror into a permanent magnet having north and south poles located along opposite edges. A large iron core having pole pieces positioned adjacent the poles on the mirror was mounted external to the turbine housing in fixed relation thereto so that the mirror rotates therebetween. A coil was wound on the core and picked up a sine wave induced therein as the mirror rotated. The signal thus generated in the magnetic pick-up was fed to a meter for measuring the number of revolutions of the mirror per unit time (EPUT) usually one second. The core of the magnetic pick-up was, however, fixed relative to the mirror and the phase of the sine wave could not, therefore, be shifted internally to indicate the position of the mirror relative to the film. The EPUT meter amplified and clipped the sine wave to form a square wave which was fed as a negative trigger voltage to a variable time delay generator that delayed a firing pulse emanating from a firing relay until the mirror was in position to expose the desired frame.

It has now been found in accordance with the present invention that the complicated and expensive variable time delay generator of the prior art rotating mirror cameras can be eliminated entirely by merely mounting the core of the magnetic pick-up so that it can be rotated and shifted relative to the turbine case and aperture therein through which the mirror reflects. This accomplishes a shift in the phase of the sine wave generated by the magnetic pick-up relative to the aperture and, therefore, the position of the mirror in relation to the film as indicated by the sine wave. Thus, by changing the position of the core as set forth above, the required time delay can be accomplished through the shift in phase of the sine wave and triggering pulse which opens an electronic gate to receive the triggering pulse from the firing relay. It is, therefore, the second object of the present invention to provide an improved and simplified means for synchronizing the position of the mirror with the initiation of the event being photographed.

It has also been found that mirrors formed from titanium are superior to those of steel for use in high-speed rotating mirror cameras. The best mirrors, however, are those formed from metals or alloys having a Poisson's ratio of less than 0.1 and an $E/D$ ratio greater than $2 \times 10^8$ per inch where $E$ is the Young's modulus expressed in pounds per square inch and $D$ is the density in pounds per cubic inch. Beryllium has a Poisson's ratio of approximately 0.028 and an $E/D$ ratio of about $6.7 \times 10^8$ per inch which makes it ideally suited for use in the fabricating of mirrors for rotating mirror cameras. Therefore, a third object of the invention is to provide an improved mirror for rotating mirror cameras formed of a non-magnetic metal or alloy having a Poisson's ratio less than 0.4 and an $E/D$ ratio not less than approximately $9 \times 10^7$ per inch and, preferably, a Poisson's ratio less than 0.1 coupled with an $E/D$ ratio greater than $2 \times 10^8$ per inch.

Mirrors formed of non-magnetic metals or alloys cannot, of course, incorporate the aforementioned magnetic pick-up feature unless they are provided with pole pieces of a magnetic material; therefore, a fourth object is the provision of a bimetallic mirror for use in rotating mirror cameras, one metal of which is magnetic and the other selected from a group comprising non-metallic metals or alloys having a Poisson's ratio less than approximately 0.4 and an $E/D$ ratio not less than approximately $9 \times 10^7$.

Other objects of the invention are to provide a magnetic pick-up unit for rotating mirror cameras which is small, lightweight, contained wholly within the turbine, requires no external mounts or wiring, provides a higher electrical output due to better magnetic coupling and thus provides an improved signal to noise ratio as well as closer timing of the mirror position, and which reduces the cost, size and complexity of the completed camera while providing greater reliability.

Another object of the invention is to provide an improved mirror construction which permits higher rotational speeds than was heretofore possible with steel mirrors.

Additional objects of the invention will be in part apparent and in part pointed out specifically hereinafter in connection with the description of the drawing that follows in which:

FIGURE 1 is a longitudinal diametrical section showing the improved high-speed gas-driven turbine of the present invention;

FIGURE 2 is an end view looking to the right in FIGURE 1, showing the control for shifting the coil and, therefore, the phase of the sine wave generated by the internal magnetic pick-up;

FIGURE 3 is a fragmentary longitudinal and diametrical section to an enlarged scale showing the magnetic pick-up and the improved bimetallic mirror construction;

FIGURE 4 is a diagram showing the relation between the steel pole piece on the mirror shaft, the poles of the iron core and the coil of the magnetic pick-up;

FIGURE 5 is a side elevation of the turbine, portions thereof having been shown in section to expose the details of the oil pressurizing system;

FIGURE 6 is a section taken along line 6—6 of FIGURE 7;

FIGURE 7 is a section taken along line 7—7 of FIGURE 6; and,

FIGURE 8 is a section taken along line 8—8 of FIGURE 3.

Referring now to the drawing, it will be seen that the turbine of the present invention, indicated in a general way by numeral 10, includes a main housing 12 having an axial bore 14 which extends from end to end thereof and receives the various operating elements which will presently be described. Mirror 16 is inserted within the axial opening 14 adjacent aperture 18 in the side of the main housing which admits light to the polished face of the mirror and reflects it onto the surface of the film, not shown. In accordance with the present invention, the mirror is formed of a non-magnetic metal or alloy having a Poisson's ratio of less than 0.4 and an $E/D$ ratio not less than approximately $9 \times 10^7$ per inch where E is the Young's modulus expressed in p.s.i. and D is the density in p./n.$^3$ and, preferably, a Poisson's radio of less than 0.1 and an $E/D$ ratio greater than approximately $2 \times 10^8$ per inch.

Stepped integral mirror shafts 20 are formed coincident with the longitudinal axis of the mirror and are provided with magnetic steel ends 22a and 22b that form journals while end 22b also forms the rotating magnetic field of the magnetic pick-up which will be described presently. The steel ends 22a and 22b and the integral shaft 20 are formed to provide a male-female tapered coupling joined together with a press fit. Both of the steel ends 22a and 22b are provided with integrally formed axial extensions 24a and 24b, respectively. Axial extension 24a is magnetized to form a permanent magnet having north and south poles arranged diametrically, as shown most clearly in FIGURE 4; whereas, the other axial extension 24b is notched at 26 to receive tongue 28 on the inner end of shaft 30 which is used solely for rotating the mirror manually.

Turbine housing elements 32 are positioned within the main housing adjacent each end of the mirror and are provided with an outer annular gas passage 34 and a plurality of radial gas passages 36 which interconnect the outer annular gas passage with an inner annular gas passage 38 formed between the turbine housing elements and elements 40 which contain the stationary blades or nozzles 42 of the turbine. The turbine wheels or rotors 44 are attached to steel ends 22a and 22b for conjoint rotation and are provided with turbine blades 46 positioned to receive gas from the nozzles 42.

Main housing 12 contains a main gas line 48 connected by a suitable fitting 50 to a source of gas under pressure, not shown. The term "gas" as used herein is intended to define any gaseous driving medium such as compressed air, hydrogen, helium and mixture thereof. The outer annular gas passage 34 of the turbine housing elements are connected into the main gas line 48 by gas intake ports 52. The gas under pressure is introduced into the turbine through gas line 48, passes from the gas line into outer annular gas passages 34 through gas intake ports 52, then moves into the inner annular air passages 38 through radial passages 36, passes through nozzles 42 against blades 46 of the turbine wheel and expands into exhaust gas cavity 54 from which it is exhausted. The rapid expansion of the gas in cavity 54 after it leaves the turbine nozzles causes it to become quite cold before passing over the surface of bearing housings 56 and 58. The bearing housings 56 and 58 fit into the ends of the axial bore 14 in the main housing. Bearing housing 56 is retained in place by an end plate 60 bolted to the end of the main housing; whereas, bearing housing 58 is held in place by end plate 62 and cover plate 64. The bearings 66 and 68 fit within the hollow interior of bearing housings 56 and 58, respectively, and are maintained in spaced relation thereto by O-rings 70. The axial extensions 24a and 24b of the steel ends 22a and 22b are journaled for rotation within bearings 66 and 68, respectively.

Bearing retaining members 72a and 72b fit within bearing housings 56 and 58, respectively, and bear against the bearings 66 and 68, respectively, holding them in position. Bearing retaining member 72b is provided with an axial opening (FIGURE 1) in which shaft 30 is mounted for both rotational and reciprocal movement. Shaft 30 projects through end plate 62 and contains a knob 71 on the outer end thereof as well as an annular groove 80 for O-ring 82 which seals the shaft against the end wall when urged into released position by compression spring 84. The end wall 62 is also provided with a threaded plug 86 that forms a closure for a fill opening communicating the interior of oil reservoir 88 formed by the bearing housing 58, bearing retainer 72b and said end wall.

In FIGURE 1 it will be seen that bearing retainers 72a and 72b cooperate respectively with bearing housings 56 and 58 to form an annular oil cavity 76 adjacent the bearings 66. Annular oil passages 78 on the exterior of the bearing housings 56 and 58 communicate with the oil cavity 76 through radial oil passages 90. The bottom of oil reservoir 88 is connected into the top of oil cavity 77 formed by the hollow interior of bearing retaining member 72b and bearing 68 by passage 79. The oil passes from cavity 77 into annular cavity 76 through port 81 in the wall of bearing retaining member 72b. Thus, the oil can contact both the inner and outer surfaces of bearing 68. From annular cavity 76 the oil moves into annular passage 78 by means of radial oil passages 90. The annular passages 78 encircling bearing housings 56 and 58 are interconnected by passage 83 in the main housing. The end of passage 83 opens into chamber 106 but is closed by plug 85. Bearing 66 is lubricated by oil passing from passage 83 into annular cavity 78, thence through radial passage 90 and into annular passage 76 which delivers oil to the outside of said bearing. Thus, an oil pressurizing system is provided within the turbine for lubricating the bearings while sealing the lubricating oil from the exhaust air cavities which are open to the atmosphere through exhaust ports, not shown. The lubricating system is pressurized by taking the driving gas which is under pressure from annular gas passage 34 through by-pass 92 in the main housing. An orifice 94 is provided in the by-pass between the annular gas passage 34 and aligned passages 96 and 98 in the main housing and bearing housing 58 which open into the oil reservoir 88. With the exception of orifice 94, the foregoing pressurized oil system is substantially the operative equivalent of the system disclosed in my copending application; however, such a system is inadequate if operated over a fairly wide range of pressures as has already been mentioned. Therefore, the turbine of the present invention incorporates a relief valve 100 in by-pass 92 which functions to maintain the gas pressure at a predetermined maximum. In the particular form shown, the relief valve 100 is a spring-biased ball check valve mounted in a cap 102 provided with an opening 104 into chamber 106 which is open to the atmosphere. In this manner the bearing clearances may be designed to conform with any desired range of low operating pressures as the relief valve can be set to open at a predetermined maximum pressure.

Referring now, in particular to FIGURES 2, 3, 4 and 8, of the drawing wherein the magnetic pick-up has been illustrated most clearly, it will be seen that bearing retaining element 72a contains a cylindrical cavity 108 in which iron core 110 is mounted with the pole pieces thereof lapping the magnetized axial extension 24a of the steel end 22a. A coil 112 encircles the core and rotation of the permanent magnetic field within axial extension 24a induces an electrical signal in the coil having substantially a sine wave form. The bearing retaining element 72a contains an integrally formed cylindrical extension 114 on which is mounted a two-part control knob 116 having a dial 118 affixed thereto by bolts 120. An insulated collar 122 is mounted on cylindrical extension 114 and is provided with longitudinally spaced annular conductors 124 which are connected to the leads from the coil which pass through the hollow core 126 of the cylindrical extension and through aligned openings 128 in the collar and said extension. The annular conductors contain a peripheral groove 130. A ring 132 is fitted into an annular groove in end plate 60 and both of these elements are fixedly bolted to the main housing. An insulator 134 is bolted to the ring and provided with longitudinally spaced grooves 136 which receive spring clip conductors 138 that interconnect said insulator with the annular conductors 124. These conductors 138 are, in turn, connected to a conventional EPUT meter (not shown) in the well-known manner. An extension 140 of the main housing encloses the above described elements of the magnetic pick-up and is provided with a fixed index 142 which registers with any selected reading on scale 144 of the dial which is calibrated in degrees.

Again with reference to FIGURE 1, it will be noted that bearing retaining member 72a, core 110, coil 112, collar 122, annular conductors 124, extension 114, control knob 116 and dial 118 are mounted for conjoint rotation within and relative to bearing housing 56, and plate 60, ring 132, insulator 136, conductors 138, housing extension 140 and main housing 12 which are fixed. Thus, rotation of knob 116 will turn the core and coil relative to the main housing and cause a shift in phase of the sine wave generated in said coil thereby incorporating any desired lead or lag in the position of the plane polished face of the mirror relative to the film. With the dial set as in FIGURE 2, there is no lead or lag and the mirror will be synchronized with the event being photographed in such a manner that the triggering pulse will initiate the event at the same instant that the mirror is positioned to expose the first frame of film. Obviously, the desired amount of time-delay or advance of the firing pulse relative to the mirror position can be accurately controlled by setting the dial. This, of course, eliminates the complicated, expensive and bulky time-delay controls found in the prior art rotating mirror cameras. Also, the small, compact magnetic pick-up incorporated entirely within the turbine housing does away with the large external pick-ups and associated wiring usually used.

Although not specifically identified, the various components of the turbine of the present invention are provided with appropriate conventional gas and oil seals wherever necessary.

Having thus described the several useful and novel features of the improved high-speed gas-operated mirror turbine of the present invention in connection with the drawing, it will be seen that the several objectives for which it was designed have been achieved. It is to be understood, however, that even though the invention has been described in connection with the one specific form thereof shown in the accompanying drawing, I realize that certain changes and modifications may be made therein by those skilled in the art within the broad teaching thereof; hence, it is my intention that the scope of protection afforded hereby shall be limited only insofar as said limitations are expressly set forth in the appended claims that follow.

What is claimed is:

1. In a rotating mirror camera, the combination of a housing, bearing means located in the housing, a mirror formed to have a polished planar face and having integral supporting shaft sections journalled for rotation within the bearing means, one of said shaft sections being of magnetic material forming a permanent magnet, means coupled with said mirror to effect rotation thereof, means for generating an electrical pulse comprising a core having pole pieces lapping the magnet of said shaft section and mounted in the housing for rotational movement into selected relative angular positions about said magnetic shaft section, a coil carried by said core for transmitting signals induced therein by the rotation of said magnet between the core pole pieces and means for effecting rotational movement of said core relative to said magnetic shaft section to selectively adjust the phase relationship between the generation of a pulse and the position of a polished planar face of the mirror.

2. The combination of claim 1, wherein the means for effecting rotational movement of said core comprises a member rotatable relative to the bearing housing, operable from the exterior of the housing and carrying the core and coil, and including means comprising a slidable electrical connection interconnecting the coil with remotely-located stationary contacts.

3. The combination of claim 1, wherein the mirror intermediate the shaft sections and on which the planar face is formed consists of a non-magnetic metal having a Poisson's ratio not greater than about 0.4 and a ratio of Young's modulus to density not less than about $9 \times 10^7$ per inch.

4. The combination of claim 1, wherein the mirror intermediate the shaft sections and on which the planar face is formed consists of a non-magnetic metal having a Poisson's ratio not greater than about 0.1 and a ratio of Young's modulus to density of not less than about $2 \times 10^8$ per inch.

5. The combination of claim 3, wherein the non-magnetic metal is titanium.

6. The combination of claim 3, wherein the non-magnetic metal is beryllium.

References Cited in the file of this patent

UNITED STATES PATENTS

| | | | |
|---|---|---|---|
| 2,464,141 | Maier | Mar. 8, | 1949 |
| 2,468,690 | Schweisthal | Apr. 26, | 1949 |
| 2,484,022 | Esval | Oct. 11, | 1949 |
| 2,519,722 | Turner | Aug. 22, | 1950 |
| 2,703,862 | Gordon | Mar. 8, | 1955 |
| 2,709,567 | Wood | May 31, | 1955 |
| 2,709,946 | Brochstein | June 7, | 1955 |
| 2,720,639 | Maltby | Oct. 11, | 1955 |
| 2,731,599 | Groeper | Jan. 17, | 1956 |
| 2,767,367 | Black | Oct. 16, | 1956 |
| 2,804,280 | Wheatley | Aug. 27, | 1957 |
| 2,832,264 | Buck | Apr. 29, | 1958 |
| 2,930,280 | Grant | Mar. 29, | 1960 |